United States Patent [19]

Berner

[11] 4,314,933

[45] Feb. 9, 1982

[54] METHOD FOR LIGHT STABILIZATION OF TWO-LAYER UNI-LACQUER COATINGS

[75] Inventor: Godwin Berner, Basel, Switzerland

[73] Assignee: Ciba-Geigy Corporation, Ardsley, N.Y.

[21] Appl. No.: 118,253

[22] Filed: Feb. 4, 1980

[30] Foreign Application Priority Data

Feb. 15, 1979 [CH] Switzerland .......................... 1484/79

[51] Int. Cl.$^3$ .......................... C08K 5/34; C08K 5/36; B32B 15/08

[52] U.S. Cl. ..................... 260/45.75 N; 260/45.75 M; 260/45.8 N; 260/45.75 W; 428/416; 428/425.8; 428/458; 428/450

[58] Field of Search ..................... 428/416, 425.8, 458, 428/460; 260/45.75 N, 45.75 M, 45.75 W, 45.8 N

[56] References Cited

U.S. PATENT DOCUMENTS

3,640,928  2/1972  Murayama et al. .............. 260/18 N
3,992,390  11/1976  Holt et al. ....................... 260/293.82
3,998,784  12/1976  Cook ....................... 260/45.75 M X

FOREIGN PATENT DOCUMENTS

2753  12/1978  European Pat. Off. ..
6213  6/1979  European Pat. Off. ..

OTHER PUBLICATIONS

Kokai No. 52-51427, 4.25.1977, Appl. No. 50-127463, Japan Abstract.
Kokai No. 52-22029, 2.19.1977, Appl. No. 50-97474, Japan Abstract.

*Primary Examiner*—P. Ives
*Attorney, Agent, or Firm*—Harry Falber

[57] ABSTRACT

The use of 2,2,6,6-tetraalkylpiperidine compounds or their acid addition salts or complexes with metal compounds, if desired together with further stabilizers, for stabilizing two-layer uni-lacquer coatings based on thermocrosslinkable acrylic, alkyd or polyester resins, which if desired can be crosslinked with melamine/formaldehyde resins, epoxide resins or polyisocyanates, against the action of light, humidity and oxygen. The stabilization indicated in this specification is particularly suitable for lacquer coatings on cars.

17 Claims, No Drawings

METHOD FOR LIGHT STABILIZATION OF TWO-LAYER UNI-LACQUER COATINGS

The present invention relates to the stabilization, by the addition of polyalkylpiperidine derivatives, of two-layer uni-lacquer coatings based on acrylic, alkyd and polyester resins, against the action of light and humidity, and also to the lacquers stabilized in this way.

It is already known from the two Japanese Patent Applications Sho 52-132050 and Sho 53-60942 that two-layer uni-lacquer coatings can be stabilized with conventional UV-absorbers. However, if good stabilization is to be ensured, these stabilizers must be used in relatively high concentrations and, moreover, in most cases they do not possess the desired lack of color which, because of the frequently varying layer thicknesses of the clear lacquers, is of extremely great importance in practice.

Typical degradation phenomena in two-layer lacquer coatings, especially crazing, blistering and delamination should, according to experience, best be prevented by UV-absorbers. However, it has now been found, surprisingly, that when light stabilizers based on polyalkylpiperidine derivatives are used excellent stabilization is achieved, even in considerably smaller concentrations, despite the lack of absorption in the near-UV range. Moreover, the requisite lack of colour is ensured by the polyalkylpiperidine derivatives.

The present invention therefore relates to the use of 2,2,6,6-tetraalkylpiperidine compounds or their acid addition salts or complexes with metal compounds, if desired together with further stabilizers, for stabilizing two-layer uni-lacquer coatings based on acrylic, alkyd or polyester resins, which, if desired, can be crosslinked with melamine/formaldehyde resins, epoxide resins or polyisocyanates, against the action of light, humidity and oxygen.

The 2,2,6,6-tetraalkylpiperidine compounds to be used according to the invention are generally known and are already employed against light degradation. They are preferably compounds which contain a group of the formula (I)

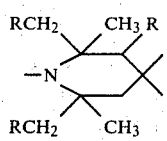

in which R is hydrogen or methyl.

The light stabilizers to be used according to the invention include, in particular, the following compound categories:

(a) Light stabilizers of the formula (II)

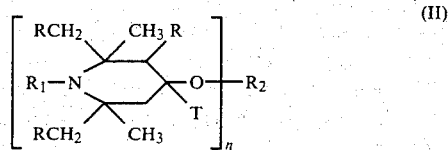

in which n is the numbers 1–4 and preferably 1 or 2, T is hydrogen or —CONH$_2$, R is as defined under formula (I), R$_1$ is hydrogen, oxyl, C$_1$–C$_{18}$ alkyl, C$_3$–C$_8$ alkenyl, C$_3$–C$_8$ alkynyl, C$_7$–C$_{12}$ aralkyl, C$_1$–C$_8$ alkanoyl, C$_3$–C$_5$ alkenoyl, glycidyl or a group —CH$_2$CH(OH)—Z, in which Z is hydrogen, methyl, ethyl or phenyl, and R$_1$ is preferably hydrogen, C$_1$–C$_{12}$ alkyl, allyl, benzyl, acetyl or acryloyl and R$_2$, if n=1, is hydrogen, C$_1$–C$_{18}$ alkyl, which can be interrupted by one or more oxygen atoms, cyanoethyl, benzyl, glycidyl, a monovalent radical of an aliphatic, cycloaliphatic, aralphatic, aromatic or heterocyclic carboxylic acid, carbamic acid or phosphorus-containing acid or a monovalent silyl radical, preferably a radical of an aliphatic carboxylic acid having 2–18 C atoms, of a cycloaliphatic carboxylic acid having 5–12 C atoms or of an aromatic carboxylic acid having 7–15 C atoms, if n=2 is C$_1$–C$_{12}$ alkylene, C$_4$–C$_{12}$ alkenylene, xylylene, a divalent radical of an aliphatic, cycloaliphatic, aralphatic, aromatic or heterocyclic dicarboxylic acid, dicarbamic acid or phosphorus-containing acid or a divalent silyl radical, preferably a radical of an aliphatic dicarboxylic acid having 2–36 C atoms, of a cycloaliphatic or aromatic dicarboxylic acid having 8–14 C atoms or of an aliphatic, cycloaliphatic or aromatic dicarbamic acid having 8–14 C atoms, if n=3 is a trivalent radical of an aliphatic, cycloaliphatic, aromatic or heterocyclic tricarboxylic acid, of an aromatic tricarbamic acid or of a phosphorus-containing acid or a trivalent silyl radical and if n=4, is a tetravalent radical of an aliphatic, cycloaliphatic or aromatic tetracarboxylic acid.

Any C$_1$–C$_{12}$ alkyl substituents are, for example, methyl, ethyl, n-propyl, n-butyl, sec.-butyl, tert.-butyl, n-hexyl, n-octyl, 2-ethyl-hexyl, n-nonyl, n-decyl, n-undecyl or n-dodecyl.

C$_1$–C$_{18}$ Alkyl R$_1$ or R$_2$ can be, for example, the groups listed above and, in addition, also, for example, n-tridecyl, n-tetradecyl, n-hexadecyl or n-octadecyl.

C$_3$–C$_8$ Alkenyl R$_1$ can be, for example, 1-propenyl, allyl, methallyl, 2-butenyl, 2-pentenyl, 2-hexenyl, 2-octenyl or 4-tert.-butyl-2-butenyl.

C$_3$–C$_8$ Alkynyl R$_1$ is preferably propargyl.

C$_7$–C$_{12}$ Aralkyl R$_1$ is especially phenethyl or in particular benzyl.

C$_1$–C$_8$ Alkanoyl R$_1$ is, for example, formyl, propionyl, butyryl or octanoyl, but preferably acetyl, and C$_3$–C$_5$ alkenoyl R$_1$ is especially acryloyl.

As a monovalent radical of a carboxylic acid, R$_2$ is, for example, the radical of acetic acid, stearic acid, salicylic acid, methacrylic acid, maleic acid, benzoic acid or β-(3,5-di-tert.-butyl-4-hydroxyphenyl)propionic acid.

As a divalent radical of a dicarboxylic acid, R$_2$ is, for example, the radical of adipic acid, suberic acid, sebacic acid, phthalic acid, dibutylmalonic acid, dibenzylmalonic acid, butyl-(3,5-di-tert.-butyl-4-hydroxybenzyl)-malonic acid or bicycloheptenedicarboxylic acid.

As a trivalent radical of a tricarboxylic acid, R$_2$ is, for example, the radical of trimellitic acid or of nitrilotriacetic acid.

R$_2$ can also be radicals of di- and tri-carboxylic acids such as are prepared industrially by oligomerisation of higher molecular weight unsaturated fatty acids or by a Diels-Alder addition of acrylic acid onto linoleic acid. R$_2$ can also be radicals which are formed by reacting mono-, di- and poly-epoxides, for example bisphenol A diglycidyl ether, butanediol diglycidyl ether, tris-glycidyl isocyanurate or 1,3-diglycidyl-4,4-dimethyl-hydantoin, with 4-hydroxy-1,2,2,6,6-pentamethylpiperidine.

As a tetravalent radical of a tetracarboxylic acid, R$_2$ is, for example, a pyromellitic acid radical.

As a divalent radical of a dicarbamic acid, $R_2$ is, for example, the radical of hexamethylenedicarbamic acid or of 2,4-toluylene-dicarbamic acid.

Examples of polyalkylpiperidine light stabilizers of this category are the following compounds:
(1) 4-Hydroxy-2,2,6,6-tetramethylpiperidine
(2) 1-Allyl-4-hydroxy-2,2,6,6-tetramethylpiperidine
(3) 1-Benzyl-4-hydroxy-2,2,6,6-tetramethylpiperidine
(4) 1-(4-tert.-Butyl-2-butenyl)-4-hydroxy-2,2,6,6-tetramethylpiperidine
(5) 4-Stearoyloxy-2,2,6,6-tetramethylpiperidine
(6) 1-Ethyl-4-salicyloyloxy-2,2,6,6-tetramethylpiperidine
(7) 4-Methacryloyloxy-1,2,2,6,6-pentamethylpiperidine
(8) 1,2,2,6,6-Pentamethylpiperidin-4-yl β-(3,5-di-tert.-butyl-4-hydroxyphenyl)-propionate
(9) 1-Benzyl-2,2,6,6-tetramethyl-4-piperidinyl maleate
(10) Di-(2,2,6,6-tetramethylpiperidin-4-yl) adipate
(11) Di-(2,2,6,6-tetramethylpiperidin-4-yl) sebacate
(12) Di-(1,2,3,6-tetramethyl-2,6-diethyl-piperidin-4-yl) sebacate
(13) Di-1-allyl-(2,2,6,6-tetramethyl-piperidin-4-yl) phthalate
(14) 1-Propargyl-4-β-cyanoethyloxy-2,2,6,6-tetramethylpiperidine
(15) 1-Acetyl-2,2,6,6-tetramethylpiperidin-4-yl acetate
(16) Tri-(2,2,6,6-tetramethylpiperidin-4-yl) trimellitate
(17) 1-Acryloyl-4-benzoyloxy-2,2,6,6-tetramethylpiperidine
(18) Di-(1,2,2,6,6-pentamethylpiperidin-4-yl) dibutyl-malonate
(19) Di-(1,2,2,6,6-pentamethylpiperidin-4-yl) butyl-(3,5-di-tert.-butyl-4-hydroxybenzyl)-malonate
(20) Di-(1,2,2,6,6-pentamethylpiperidin-4-yl) dibenzyl-malonate
(21) Di-(1,2,3,6-tetramethyl-2,6-diethyl-piperidin-4-yl) dibenzyl-malonate
(22) Hexane-1',6'-bis-(4-carbamoyloxy-1-n-butyl-2,2,6,6-tetramethylpiperidine)
(23) Toluene-2',4'-bis-(4-carbamoyloxy-1-n-propyl-2,2,6,6-tetramethylpiperidine)
(24) Dimethyl-bis-(2,2,6,6-tetramethylpiperidin-4-oxy) silane
(25) Phenyl-tris-(2,2,6,6-tetramethylpiperidin-4-oxy) silane
(26) Tris-(1-propyl-2,2,6,6-tetramethylpiperidin-4-yl) phosphite
(27) Tris-(1-propyl-2,2,6,6-tetramethylpiperidin-4-yl) phosphate
(28) Bis-(1,2,2,6,6-pentamethylpiperidin-4-yl) phenylphosphonate
(29) Di-(1,2,2,6,6-pentamethylpiperidin-4-yl) sebacate
(30) Di-(1-benzyl-2,2,6,6-tetramethylpiperidin-4-yl) sebacate
(31) Di-(1-allyl-2,2,6,6-tetramethylpiperidin-4-yl) sebacate
(31a) 2,2,6,6-Tetramethyl-4-hydroxy-4-carbamoyl-piperidine.

(b) Light stabilizers of the formula (III)

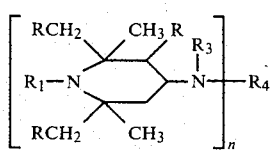

in which n is the number 1 or 2, R is as defined under formula I, $R_1$ is as defined under (a), $R_3$ is hydrogen, $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl or benzoyl and $R_4$, if n=1, is hydrogen, $C_1$–$C_{18}$ alkyl, $C_5$–$C_7$ cycloalkyl, $C_2$–$C_8$ alkenyl, which is unsubstituted or substituted by a cyano, alkoxycarbonyl or carbamide group, glycidyl or a group of the formula —$CH_2$—$CH(OH)$—$Z''$ or of the formula —$CONH$—$Z''$, in which $Z''$ is hydrogen, methyl or phenyl; and if n=2 is $C_2$–$C_{12}$ alkylene, $C_6$–$C_{12}$ arylene, xylylene, a —$CH_2$—$CH(OH)$—$CH_2$ group or a group —$CH_2$—$CH(OH)$—$CH_2$—O—X—O—$CH_2CH(OH)$—$CH_2$—, in which x is $C_2$–$C_{10}$ alkylene, $C_6$–$C_{15}$ arylene or $C_6$–$C_{12}$ cycloalkylene, or, with the proviso that $R_3$ is not alkanoyl, alkenoyl or benzoyl, $R_4$ can also be a divalent radical of an aliphatic, cycloaliphatic or aromatic dicarboxylic acid or dicarbamic acid or the group —CO—, or $R_3$ and $R_4$ together, if n=1, can be the imide radical of an aliphatic, cycloaliphatic or aromatic 1,2- or 1,3-dicarboxylic acid.

Any $C_1$–$C_{18}$ alkyl substituents are as already defined under (a).

Any $C_5$–$C_7$ cycloalkyl substituents are in particular cyclohexyl.

$C_7$–$C_8$ Aralkyl $R_3$ is especially phenethyl or in particular benzyl.

$C_2$–$C_{18}$ Alkanoyl $R_3$ is, for example, propionyl, butyryl, octanoyl, dodecanoyl, hexadecanoyl or octadecanoyl, but preferably acetyl, and $C_3$–$C_5$ alkenoyl $R_3$ is especially acryloyl.

As $C_2$–$C_8$ alkenyl which is unsubstituted or substituted by a cyano, carbonyl or carbamide group, $R_4$ is, for example, 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

Any $C_2$–$C_{12}$ alkylene substituents are, for example, ethylene, propylene, 2,2-dimethylpropylene, tetramethylene, hexamethylene, octamethylene, decamethylene or dodecamethylene.

Any $C_6$–$C_{15}$ arylene substituents are, for example, o-, m- or p-phenylene, 1,4-naphthylene or 4,4'-diphenylene.

$C_6$–$C_{12}$ Cycloalkylene X is in particular cyclohexylene.

Examples of polyalkylpiperidine light stabilizers of this category are the following compounds:
(32) N,N'-Bis-(2,2,6,6-tetramethylpiperidin-4-yl)-hexamethylene-1,6-diamine
(33) N,N'-Bis-(2,2,6,6-tetramethylpiperidin-4-yl)-hexamethylene-1,6-diacetamide
(34) 1-Acetyl-4-(N-cyclohexylacetamido)-2,2,6,6-tetramethylpiperidine
(35) 4-Benzylamino-2,2,6,6-tetramethylpiperidine
(36) N,N'-Bis-(2,2,6,6-tetramethylpiperidin-4-yl)-N,N'-dibutyl-adipamide
(37) N,N'-Bis-(2,2,6,6-tetramethylpiperidin-4-yl)-N,N'-dicyclohexyl-(2-hydroxypropylene)
(38) N,N'-Bis-(2,2,6,6-tetramethylpiperidin-4-yl)-p-xylylene-diamine
(39) The compound of the formula

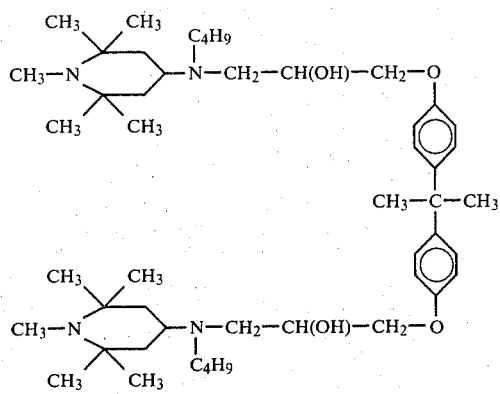

(40) 4-(Bis-2-hydroxyethyl)-amino-1,2,2,6,6-pentamethylpiperidine
(41) 4-(3-Methyl-4-hydroxy-5-tert.-butyl-benzoic acid amido)-2,2,6,6-tetramethylpiperidine
(42) 4-Methacrylamido-1,2,2,6,6-pentamethylpiperidine
(43) Methyl α-cyano-β-methyl-[N-(2,2,6,6-tetramethyl-piperidin-4-yl)]-amino-acrylate.

(c) Light stablizers of the formula (IV)

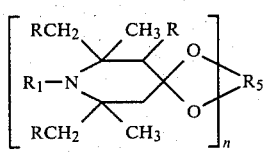

in which n is the number 1 or 2, R is as defined under formula (I), $R_1$ is as defined under (a) and $R_5$, if n=1, is $C_2$–$C_8$ alkylene or hydroxyalkylene or $C_4$–$C_{22}$ acyloxyalkylene and, if n=2, is the group (—$CH_2$)$_2$C(C-$H_2$—)$_2$.

$C_2$–$C_8$ Alkylene or hydroxyalkylene $R_5$ is, for example, ethylene, 1-methyl-ethylene, propylene, 2-ethyl-propylene or 2-ethyl-2-hydroxymethylpropylene.

$C_4$–$C_{22}$ Acyloxyalkylene $R_5$ is, for example, 2-ethyl-2-acetoxymethyl-propylene.

Examples of polyalkylpiperidine light stabilizers of this category are the following compounds:
(44) 9-Aza-8,8,10,10-tetramethyl-1,5-dioxaspiro[5.5]undecane
(45) 9-Aza-8,8,10,10-tetramethyl-3-ethyl-1,5-dioxaspiro[5.5]decane
(46) 8-Aza-2,7,7,8,9,9-hexamethyl-1,4-dioxaspiro[4.5]decane
(47) 9-Aza-3-hydroxymethyl-3-ethyl-8,8,9,10,10-pentamethyl-1,5-dioxaspiro[5.5]undecane
(48) 9-Aza-3-ethyl-3-acetoxymethyl-9-acetyl-8,8,10,10-tetramethyl-1,5-dioxaspiro[5.5]undecane
(49) 2,2,6,6-Tetramethylpiperidine-4-spiro-2'-(1',3'-dioxan)-5'-spiro-5''-(1'',3''-dioxan)-2''-spiro-4'''-(2''',2''',6''',6'''-tetramethylpiperidine).

(d) Light stabilizers of the formulae (VA), (VB) and (VC)

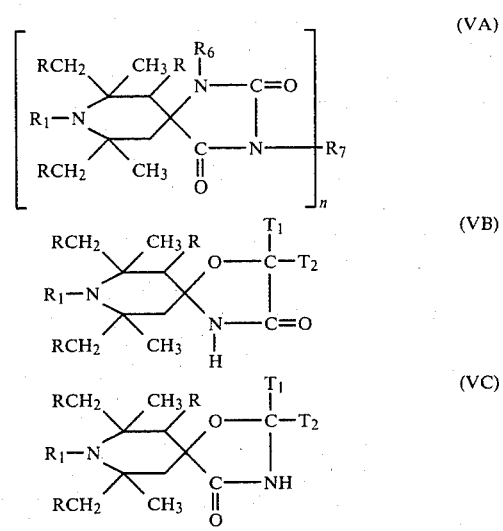

in which n is the number 1 or 2, R is as defined under formula (I), $R_1$ is as defined under (a), $R_6$ is hydrogen, $C_1$–$C_{12}$ alkyl, allyl, benzyl, glycidyl or $C_2$–$C_6$ alkoxyalkyl and $R_7$, if n=1, is hydrogen, $C_1$–$C_{12}$ alkyl, $C_3$–$C_5$ alkenyl, $C_7$–$C_9$ aralkyl, $C_5$–$C_7$ cycloalkyl, $C_2$–$C_4$ hydroxyalkyl, $C_2$–$C_6$ alkoxyalkyl, $C_6$–$C_{10}$ aryl, glycidyl or a group of the formula —($CH_2$)$_m$—COO—Q or of the formula —($CH_2$)$_m$—O—CO—Q, in which m is 1 or 2 and Q is $C_1$–$C_{18}$ alkyl or phenyl, and if n=2 is $C_2$–$C_{12}$ alkylene, $C_6$–$C_{12}$ arylene, $C_4$–$C_{12}$ alkenylene, a group —$CH_2$—CH(OH)—$CH_2$—O—X—O—$CH_2$—CH(OH)—$CH_2$—, in which X is $C_2$–$C_{10}$ alkylene, $C_6$–$C_{15}$ arylene or $C_6$–$C_{12}$ cycloalkylene, or a group —$CH_2$CH(OZ')$CH_2$-(O$CH_2$—CH(OZ')$CH_2$)$_2$—, in which Z' is hydrogen, $C_1$–$C_{18}$ alkyl, allyl, benzyl, $C_2$–$C_{12}$ alkanoyl or benzoyl, and $T_1$ and $T_2$ independently of one another are hydrogen, $C_1$–$C_{18}$ alkyl or $C_6$–$C_{10}$ aryl which is unsubstituted or substituted by halogen or $C_1$–$C_4$ alkyl, or $C_7$–$C_9$ aralkyl, or $T_1$ and $T_2$ together with the C atom which bonds them form $C_5$–$C_7$ cycloalkyl, pyrrolidinyl or piperidinyl, which are unsubstituted or substituted by $C_1$–$C_4$ alkyl.

Any $C_1$–$C_{12}$ alkyl substituents are, for example, methyl, ethyl, n-propyl, n-butyl, sec.-butyl, tert.-butyl, n-hexyl, n-octyl, 2-ethyl-hexyl, n-nonyl, n-decyl, n-undecyl or n-dodecyl.

Any $C_1$–$C_{18}$ alkyl substituents can be, for example, the groups listed above and, in addition, also, for example, n-tridecyl, n-tetradecyl, n-hexadecyl or n-octadecyl.

Any $C_2$–$C_6$ alkoxyalkyl substituents are, for example, methoxymethyl, ethoxymethyl, propoxymethyl, tert.-butoxymethyl, ethoxyethyl, ethoxypropyl, n-butoxyethyl, tert.-butoxyethyl, isopropoxyethyl or propoxypropyl.

$C_3$–$C_5$ Alkenyl $R_7$ is, for example, 1-propenyl, allyl, methallyl, 2-butenyl or 2-pentenyl.

$C_7$–$C_9$ Aralkyl $R_7$, $T_1$ and $T_2$ is especially phenethyl or in particular benzyl, and $C_5$–$C_7$ cycloalkyl $R_7$, $T_1$ and $T_2$ ($T_1$ and $T_2$ together with the C atom which bonds them) is in particular cyclohexyl.

$C_2$–$C_4$ Hydroxyalkyl $R_7$ is, for example, 2-hydroxyethyl, 2-hydroxypropyl, 2-hydroxybutyl or 4-hydroxybutyl.

$C_6$–$C_{10}$ Aryl $R_7$, $T_1$ and $T_2$ is especially phenyl or α- or β-naphthyl, which are unsubstituted or substituted by halogen or $C_1$–$C_4$ alkyl.

$C_2$–$C_{12}$ alkylene $R_7$ is, for example, ethylene, propylene, 2,2-dimethylpropylene, tetramethylene, hexamethylene, octamethylene, decamethylene or dodecamethylene.

$C_4$–$C_{12}$ Alkenylene $R_7$ is especially 2-butenylene, 2-pentenylene or 3-hexenylene.

$C_6$–$C_{12}$ Arylene $R_7$ is, for example, o-, m- or p-phenylene, 1,4-naphthylene or 4,4'-diphenylene.

$C_2$–$C_{12}$ Alkanoyl $Z'$ is, for example, propionyl, butyryl, octanoyl or dodecanoyl but preferably acetyl.

$C_2$–$C_{10}$ Alkylene, $C_6$–$C_{15}$ arylene or $C_6$–$C_{12}$ cycloalkylene X is as defined under (b).

Examples of polyalkylpiperidine light stabilizers of this category are the following compounds:

(50) 3-Benzyl-1,3,8-triaza-7,7,9,9-tetramethylspiro[4.5]-decane-2,4-dione
(51) 3-n-Octyl-1,3,8-triaza-7,7,9,9-tetramethylspiro[4.5]-decane-2,4-dione
(52) 3-Allyl-1,3,8-triaza-1,7,7,9,9-pentamethylspiro[4.5]-decane-2,4-dione
(53) 3-Glycidyl-1,3,8-triaza-7,7,8,9,9-pentamethylspiro[4.5]decane-2,4-dione
(53a) 2-iso-Propyl-7,7,9,9-tetramethyl-1-oxa-3,8-diaza-4-oxo-spiro[4.5]decane
(53b) 2-Butyl-7,7,9,9-tetramethyl-1-oxa-3,8-diaza-4-oxospiro[4.5]decane
(53c) 2-Isopropyl-7,7,9,9-tetramethyl-1-oxa-4,8-diaza-3-oxospiro[4.5]decane
(53d) 2-Butyl-7,7,9,9-tetramethyl-1-oxa-4,8-diaza-3-oxospiro[4.5]decane or the compounds of the following formulae:

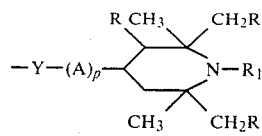

in which R is as defined under formula (I), $R_1$ is as defined under (a), Y is —O— or —NR$_{11}$—, A is $C_2$–$C_6$ alkylene or —(CH$_2$)$_3$—O— and p is the numbers 0 or 1, $R_9$ is the groups $R_8$, NR$_{11}$R$_{12}$, —OR$_{13}$, —NHCH$_2$OR$_{13}$ or —N(CH$_2$OR$_{13}$)$_2$, and $R_{10}$, if n=1, is the groups $R_8$ or $R_9$, and if n=2, is the group —Y—D—Y—, in which D is $C_2$–$C_6$ alkylene which can be interrupted by —N(R$_{1}$)—, and $R_{11}$ is $C_1$–$C_{12}$ alkyl, cyclohexyl, benzyl or $C_1$–$C_4$ hydroxyalkyl or a group of the formula

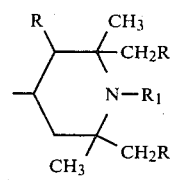

$R_{12}$ is $C_1$–$C_{12}$ alkyl, cyclohexyl, benzyl or $C_1$–$C_4$ hydroxyalkyl, $R_{13}$ is hydrogen, $C_1$–$C_{12}$ alkyl or phenyl and $R_{14}$ is hydrogen, $C_1$–$C_{12}$ alkyl, cyclohexyl, benzyl or phenyl, or $R_{11}$ and $R_{12}$ together are $C_4$–$C_5$ alkylene or oxaalkylene, or $R_{11}$ and $R_{12}$ are each a group of the formula

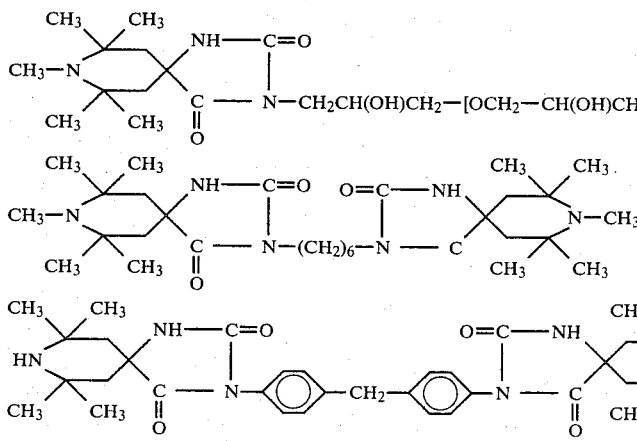

(e) Light stabilizers of the formula (VI)

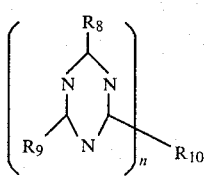

in which n is the number 1 or 2 and $R_8$ is a group of the formula

Any $C_1$–$C_{12}$ alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$–$C_4$ hydroxyalkyl substituents are, for example, 2-hydroxyethyl, 2-hydroxypropyl, 3-hydroxypropyl, 2-hydroxybutyl or 4-hydroxybutyl.

$C_2$–$C_6$ Alkylene A is, for example, ethylene, propylene, 2,2-dimethylpropylene, tetramethylene or hexamethylene.

$C_4$–$C_5$ Alkylene or oxaalkylene formed by $R_{11}$ and $R_{12}$ together is, for example, tetramethylene, pentamethylene or 3-oxa-pentamethylene.

Examples of polyalkylpiperidine light stabilizers of this category are the compounds of the following formulae:

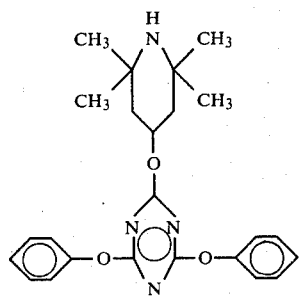

(57)

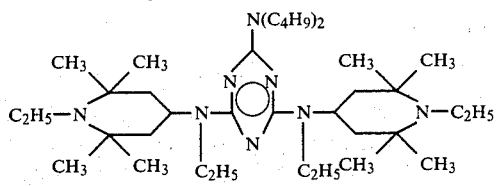

(58)

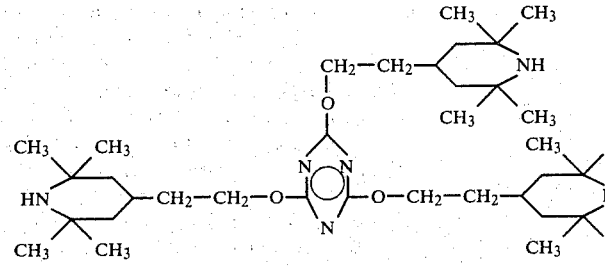

(59)

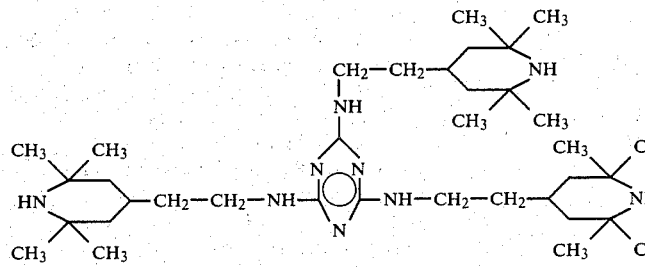

(60)

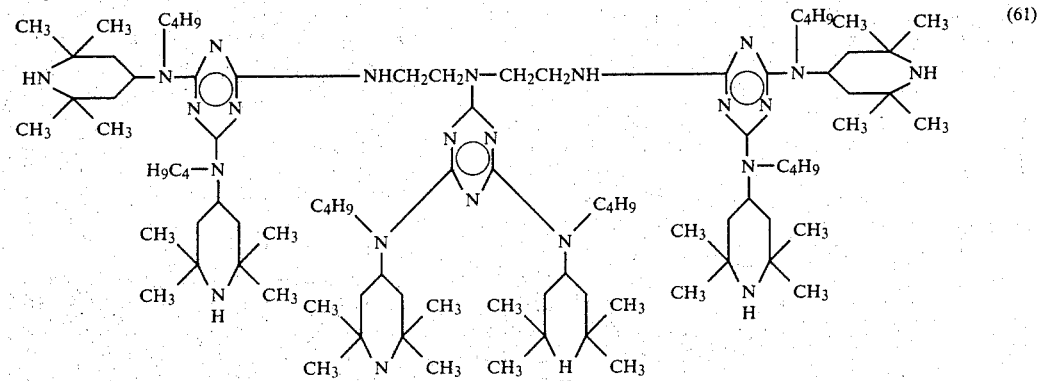

(61)

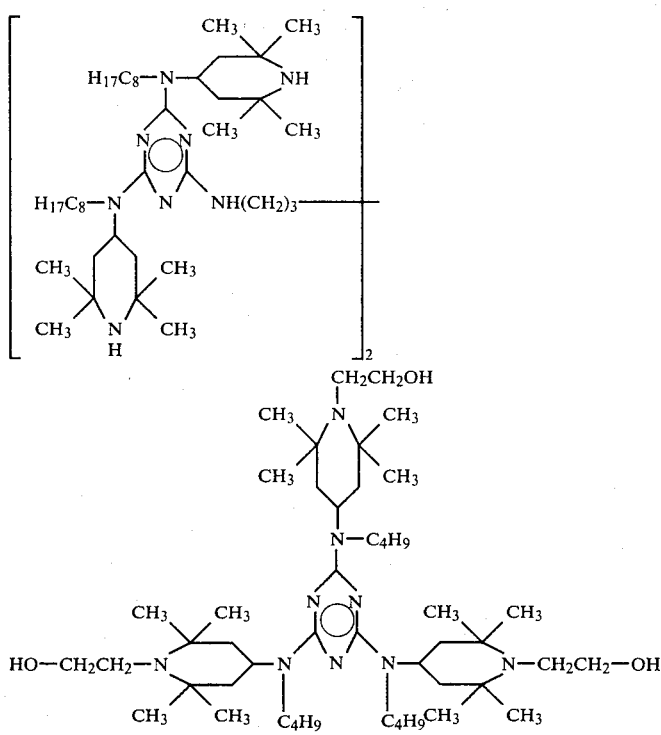

(62)

(63)

(f) Light stabilizers of the formula (VII)

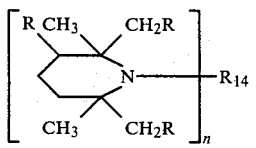

in which n is the number 1 or 2, R is as defined under formula (I) and $R_{14}$, if n=1, is $C_4$–$C_{18}$ alkyl, $C_7$–$C_{12}$ aralkyl, the group —CO—$R_{15}$ or $C_1$–$C_4$ alkyl substituted by —CN, —COOR$_{16}$, —OH, —OCOR$_{17}$ or

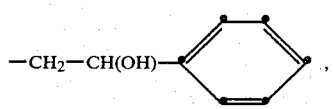

in which $R_{15}$ is $C_1$–$C_{12}$ alkyl, $C_2$–$C_4$ alkenyl or phenyl, $R_{16}$ is $C_1$–$C_{18}$ alkyl and $R_{17}$ is $C_1$–$C_{18}$ alkyl, $C_2$–$C_{10}$ alkenyl, cyclohexyl, benzyl or $C_6$–$C_{10}$ aryl, or, if n=2, $R_{14}$ is $C_4$–$C_{12}$ alkylene, 2-but-1,4-enylene, xylylene, the group —(CH$_2$)$_2$—OOC—$R_{18}$—COO—(CH$_2$)$_2$— or the group —CH$_2$—OOC—$R_{19}$—COO—CH$_2$—, in which $R_{18}$ is $C_2$–$C_{10}$ alkylene, phenylene or cyclohexylene and $R_{19}$ is $C_2$–$C_{10}$ alkylene, xylylene or cyclohexylene.

Any $C_1$–$C_{12}$ alkyl substituents are, for example, methyl, ethyl, n-propyl, n-butyl, sec.-butyl, tert.-butyl, n-hexyl, n-octyl, 2-ethyl-hexyl, n-nonyl, n-decyl, n-undecyl or n-dodecyl.

Any $C_1$–$C_{18}$ alkyl substituents can be, for example, the groups listed above and, in addition, also, for example, n-tridecyl, n-tetradecyl, n-hexadecyl or n-octadecyl.

Any $C_2$–$C_{10}$ alkylene groups are, for example, ethylene, propylene, 2,2-dimethylpropylene, tetramethylene, hexamethylene, octamethylene or decamethylene.

$C_4$–$C_{18}$ Alkyl $R_{14}$ is, for example, n-butyl, sec.-butyl, tert.-butyl, n-hexyl, n-octyl, 2-ethyl-hexyl, 1,1-dimethyl-2-tert.-butylethyl, n-nonyl, n-decyl, n-dodecyl, n-tridecyl, n-tetradecyl, n-hexadecyl or n-octadecyl.

As $C_1$–$C_4$ alkyl substituted by —CN, $R_{14}$ is, for example, cyanomethyl, cyanoethyl, 3-cyano-n-propyl or 4-cyano-n-butyl.

$C_4$–$C_{12}$ Alkylene $R_{14}$ is, for example, 2,2-dimethylpropylene, tetramethylene, hexamethylene, octamethylene, decamethylene or dodecamethylene.

$C_7$–$C_{12}$ Aralkyl $R_{14}$ is especially phenethyl or p-methyl-benzyl or in particular benzyl.

$C_2$–$C_4$ Alkenyl $R_{15}$ is, for example, vinyl, 1-propenyl, allyl, methallyl or 2-butenyl.

$C_2$–$C_{10}$ Alkenyl $R_{17}$ is, for example, the groups listed for alkenyl $R_{15}$ and, in addition, also, for example, crotyl, 2-hexenyl, 2-octenyl or 2-decenyl.

$C_6$–$C_{10}$ Aryl $R_{17}$ is, for example, phenyl which is unsubstituted or substituted in the o-position or p-position by methyl, ethyl, isopropyl, n-butyl or tert.-butyl.

Examples of polyalkylpiperidine light stabilizers of this category are the following compounds:

(64) Bis-[β-(2,2,6,6-tetramethylpiperidino)-ethyl] sebacate
(65) n-Octyl α-(2,2,6,6-tetramethyl-piperidino)-acetate
(66) 1,4-Bis-(2,2,6,6-tetramethylpiperidino)-2-butene.

(g) Light stabilizers of the formula (VIII)

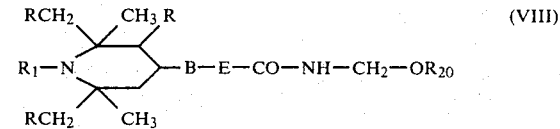

(VIII)

in which B is $-N(R_{21})-$ or $-O-$, E is $C_1-C_3$ alkylene, the group $-CH_2-CH(R_{22})-O-$, in which $R_{22}$ is hydrogen, methyl or phenyl, the group $-(CH_2)_3-NH-$ or a single bond, R is hydrogen or methyl, $R_1$ is as defined under a), $R_{20}$ is hydrogen or $C_1-C_{18}$ alkyl and $R_{21}$ is hydrogen, $C_1-C_{18}$ alkyl, $C_5-C_7$ cycloalkyl, $C_7-C_{12}$ aralkyl, cyanoethyl, $C_6-C_{10}$ aryl, the group $-CH_2-CH(R_{22})-OH$, in which $R_{22}$ is as defined above, a group of the formula

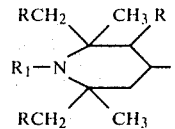

or a group of the formula

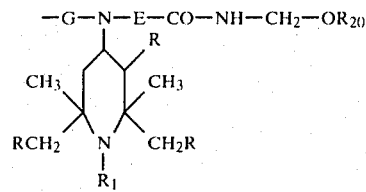

in which G can be $C_2-C_6$ alkylene or $C_6-C_{12}$ arylene, or $R_{21}$ is a group $-E-CO-NH-CH_2-OR_{20}$.

Any $C_1-C_{18}$ alkyl substituents are, for example, methyl, ethyl, n-propyl, n-butyl, sec.-butyl, tert.-butyl, n-hexyl, n-octyl, 2-ethyl-hexyl, n-nonyl, n-decyl, n-undecyl, n-dodecyl, n-tridecyl, n-tetradecyl, n-hexadecyl or n-octadecyl.

Any $C_7-C_{12}$ aralkyl substituents are, for example, phenethyl or especially benzyl.

$C_3-C_8$ Alkenyl $R_1$ can be, for example, 1-propenyl, allyl, methallyl, 2-butenyl, 2-pentenyl, 2-hexenyl, 2-octenyl or 4-tert.-butyl-2-butenyl.

$C_3-C_8$ Alkynyl $R_1$ is preferably propargyl. $C_1-C_8$ Alkanoyl $R_1$ is, for example, formyl, propionyl, butyryl, or octanoyl, but preferably acetyl, and $C_3-C_5$ akenoyl $R_1$ is in particular acryloyl.

$C_5-C_7$ Cycloalkyl $R_{21}$ is in particular cyclohexyl.

$C_6-C_{10}$ Aryl $R_{21}$ is in particular phenyl or α- or β-naphthyl, which are unsubstituted or substituted by halogen or $C_1-C_4$ alkyl. $C_1-C_3$ Alkylene E is, for example, methylene, ethylene or propylene.

$C_2-C_6$ Alkylene G is, for example, ethylene, propylene, 2,2-dimethylpropylene, tetramethylene or hexamethylene and $C_6-C_{12}$ arylene G is o-, m- or p-phenylene, 1,4-naphthylene or 4,4'-diphenylene.

Examples of polyalkylpiperidine light stabilizers of this category are the following compounds:

(67) N-Hydroxymethyl-N'-2,2,6,6-tetramethylpiperidin-4-yl-urea
(68) N-Methoxymethyl-N'-2,2,6,6-tetramethylpiperidin-4-yl-urea
(69) N-Methoxymethyl-N'-n-dodecyl-N'-2,2,6,6-tetramethylpiperidin-4-yl-urea
(70) O-(2,2,6,6-Tetramethylpiperidin-4-yl)-N-methoxymethyl-urethane.

(h) Polymeric compounds in which the recurring structural unit contains a polyalkylpiperidine radical of the formula (I), especially polyesters, polyethers, polyamides, polyamines, polyurethanes, polyureas, polyaminotriazines, poly(meth)acrylates, poly(meth)acrylamides and their copolymers which contain such radicals.

Examples of polyalkylpiperidine light stabilizers of this category are the compounds of the following formulae, in which m is the numbers 2 to about 200.

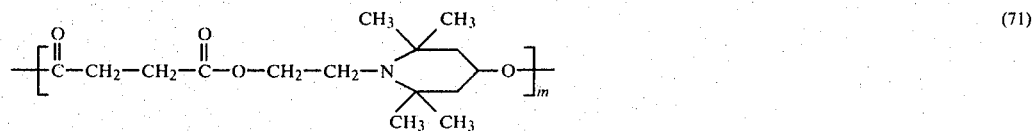

(71)

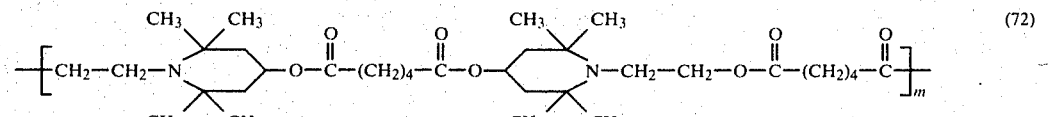

(72)

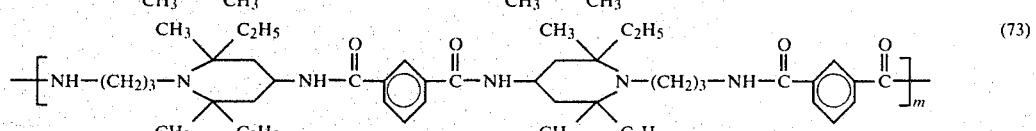

(73)

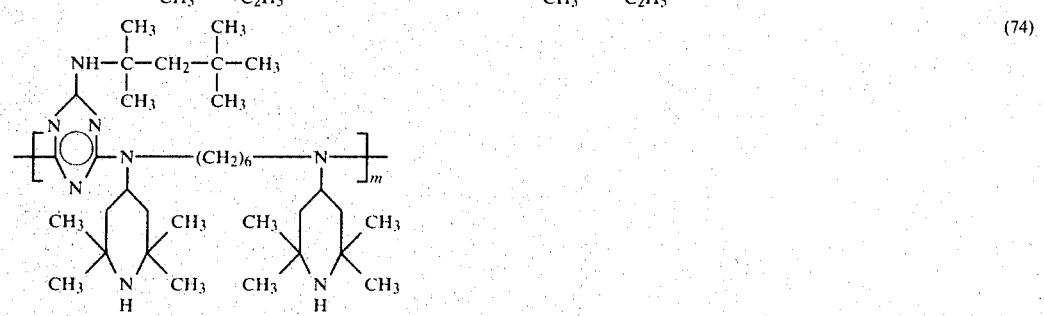

(74)

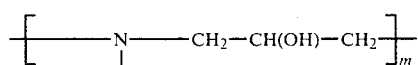
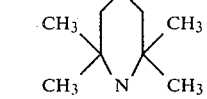
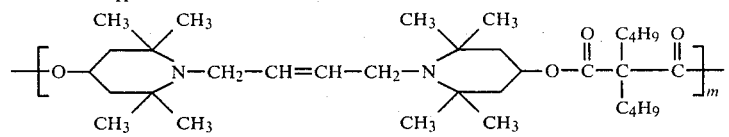
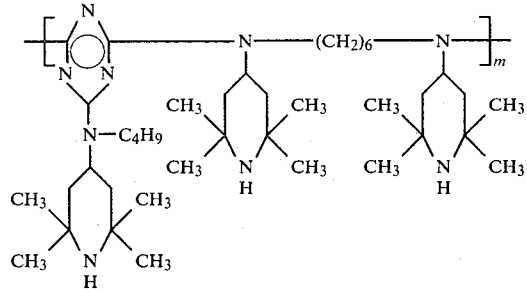
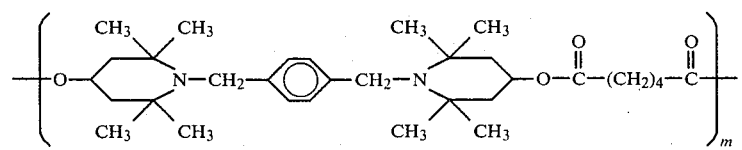
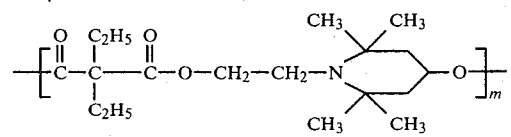
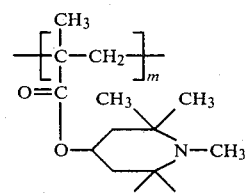
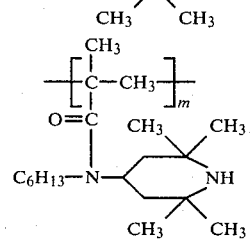
(i) Compounds which contain, in their molecule, at least one 2-(2′-hydroxyphenyl)-benztriazole group or 2-hydroxybenzophenone group and at least one polyalkylpiperidine group.
Examples of polyalkylpiperidine light stabilizers of this category are the compounds of the following formulae:
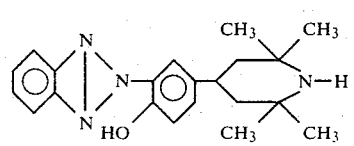
-continued
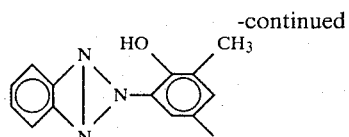
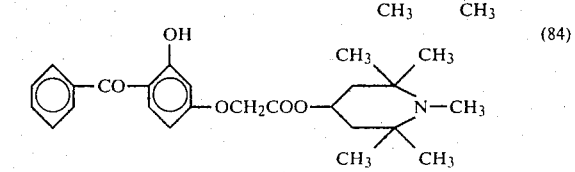

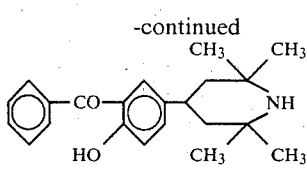

(85)

It is also possible to use polyalkylpiperidine derivatives of categories (a)–(i) which enter into chemical bonds with the binder of the lacquer. This is the case if the polyalkylpiperidine derivative possesses a reactive group suitable for this purpose, for example a glycidyl group or a methylol group.

Examples of such compounds are the polyalkylpiperidine derivatives of category (g) which contain methylol groups or methylol-ether groups.

If the polyalkylpiperidine compounds are basic compounds, they can form salts with acids. Suitable acids for this purpose are, for example, inorganic acids or organic carboxylic, sulfonic, phosphonic or phosphinic acids, for example hydrochloric acid, boric acid, phosphoric acid, acetic acid, salicylic acid, toluenesulfonic acid or benzenephosphonic acid.

The polyalkylpiperidine compounds can form complexes with complex-forming metal compounds, for example with zinc-II acetate, cobalt-II acetylacetonate, nickel-II acetylacetonate, aluminium-III acetylacetonate, nickel-II benzoate or aluminum-III benzoylacetonate.

The customary stoving lacquers which are based on acrylic, alkyd or polyester resins, which, if desired, can be crosslinked with melamine/formaldehyde resins, epoxide resins or polyisocyanates, and which are described, for example in H. Wagner and H. F. Sarx, Lackkunstharze (Synthetic Lacquer Resins) can be used to prepare the two-layer uni-lacquer coatings stabilized according to the invention against light, humidity and oxygen.

The lacquers are applied by the conventional twocoat process, for example by spraying the undercoat lacquer containing the pigment in a layer thickness of 20–30μ onto coil-coated sheet metal, onto which a commercially available filler had previously been baked in a layer thickness of 20–30μ, and, after air-drying for about 5 minutes, applying the topcoat lacquer wet-in-wet in a layer thickness of 35–40μ. After further air-drying for about 15 minutes, the lacquer is baked at 80°–150° C., depending on the nature of the crosslinking agent, for about 30 minutes.

The amount of polyalkylpiperidine derivative added is 0.01 to 5% by weight, based on the solvent-free binder, and preferably 0.5 to 1% by weight. The lacquers can contain the customary organic solvents or can be dissolved or dispersed in water or can be free from solvent.

The polyalkylpiperidine derivative to be used for stabilization according to the invention can be incorporated either only into the unpigmented topcoat lacquer or both into the unpigmented topcoat lacquer and into the undercoat lacquer containing pigment. Preferably, the light stabilizer is incorporated in the unpigmented topcoat lacquer. Topcoat lacquers based on acrylic/melamine resins are preferred. When preparing acrylic resins or acrylic-modified alkyd resins, polymerisable polyalkylpiperidine derivatives (for example compounds 7 and 42) can be copolymerised in the resin.

Incorporation into the lacquer binder can, however, also be effected by a polycondensation reaction during the preparation or in some cases during baking of the melamine, alkyd or polyester resins. Examples of co-condensable polyalkylpiperidine derivatives are compounds 1 and 63 and also 1-hydroxyethyl-4-hydroxy-2,2,6,6-tetramethylpiperidine or the compounds of the formulae

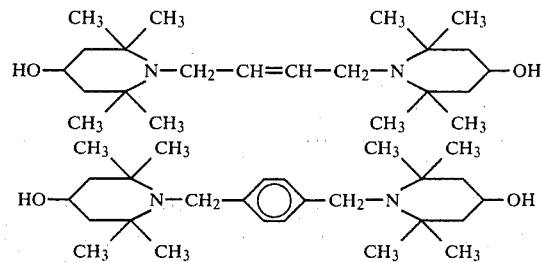

Incorporation by a polyaddition reaction can take place, for example, via the reaction of free carboxyl groups in the acrylic resin with glycidyl groups of the polyalkylpiperidine derivative. These carboxyl groups can be incorporated, for example, by the copolymerisation of acrylic acid.

In these cases there is the additional advantage that the light stabilizers are not removable by extraction or migration, so that their action is very longlasting.

In order to achieve maximum stability to light, it can be advantageous additionally to use other conventional light stabilizers. Examples of these are UV-absorbers of the type comprising the benzophenones, oxalanilides, benztriazoles or acrylic acid derivatives, or metal-containing light stabilizers, for example organic nickel compounds.

In the case of such combinations, the sum of all of the light stabilisers is 0.02 to 5% by weight and preferably 0.5 to 2% by weight, based on the lacquer resin.

Further additives which can be contained in the lacquer are antioxidants, for example those of the type comprising sterically hindered phenol derivatives or organic phosphorus compounds, for example phosphites, phosphonites or phosphines, plasticizers, flow control agents, curing accelerators, for example organic Co salts, Mn salts or Zr salts, thickeners, dispersing agents or adhesion improvers.

The stabilization according to the invention is particularly suitable for lacquer coatings on vehicles.

The following examples describe the use, according to the invention, of polyalkylpiperidine derivatives in two-layer uni-lacquer coatings. Parts and percentages are by weight.

EXAMPLE 1

Basic recipe for the lacquers

| (a) | Undercoat lacquer | | |
|---|---|---|---|
| | Alftalat AC 451 (alkyd resin from Hochst) | 51.56 | parts |
| | Maprenal MF 590 (melamine/formaldehyde resin from Hochst) | 20.7 | parts |
| | TiO$_2$ | 27.6 | parts |
| | C.I. Pigment Yellow 24 | 0.14 | part | dissolved in a solvent mixture consisting of 44% of xylene, 26% of petroleum ether and 30% of butyl acetate.

| (b) Topcoat lacquer | |
|---|---|
| Viacryl VC 1341/60% (acrylic resin from Vianova Kunstharz AG) in Shellsol A/butyl acetate | 62.5 parts |
| Maprenal MF 825/71% (melamine/formaldehyde resin from Hochst) in isobutanol | 17.6 parts |
| Solvesso 100 (solvent from Esso) | 19.4 parts |
| Paint Additive 11 (flow control agent from Dow Corning Corp.) | 0.5 part |

Production of the two-layer uni-lacquer coating

A commercially available filler (Standox filling primer) is first sprayed in a layer thickness of 30μ onto coil-coated sheet aluminium and is baked for 15 minutes at 175° C. The pigmented undercoat lacquer is then sprayed on in a layer thickness of about 30μ and, after air-drying for 5 minutes, the unpigmented topcoat lacquer is applied wet-in-wet in a layer thickness of 35–40μ. The lacquer is then baked for 30 minutes at 130° C.

Weathering

The metal sheets thus obtained are stored for four weeks under standard climatic conditions (23° C./50% relative atmospheric humidity) and then subjected to weathering in a QUV apparatus according to ASTM G53-77.

When the tests described below were carried out, the light stabilizer indicated in column II of the tables 1, 2 and 3 given below (the stabilisers being numbered in accordance with the examples mentioned in the description in the case of the polyalkylpiperidine compounds to be used according to the invention) was added, in each case in the amount indicated in % (based on the lacquer resin) in column I of the said tables, to the topcoat lacquer before the latter was applied.

Yellowing test after weathering for 1,200 hours

The change in the blue-yellow value (Δ BYV) is a measure of the yellowing of the lacquers. It is determined by calculation from the photometrically determined colour coordinates. The corresponding values are listed in column III of Tables 1, 2 and 3 given below.

Reduction in gloss after weathering for 1,200 hours

The gloss values determined after weathering for 1,200 hours and in accordane with ASTM D 523 are listed in column IV of Tables 1, 2 and 3 given below.

Visual appearance of the lacquer-coated metal sheets after weathering for 1,200 hours After weathering, the metal sheets were examined for cloudiness, crazing, blistering and delamination. The findings are listed in column V of Tables 1, 2 and 3 given below.

TABLE 1

Light stabilizing action of the polyalkylpiperidine derivatives

| I % | II Light stabilizer | III Δ BYV after weathering (QUV) for 1,200 hours | IV 20° gloss after weathering (QUV) 0 hours | IV 20° gloss after weathering (QUV) 1,200 hours | V Appearance after weathering (QUV) for 1,200 hours |
|---|---|---|---|---|---|
| — | — | 16 | 97 | 16 | crazing and blistering and delamination |
| 1 | Compound 11 | 8.7 | 99 | 94 | isolated blistering |
| 1 | Compound 19 | 9.3 | 98 | 91 | isolated blistering |
| 1 | Compound 53 | 9.5 | 97 | 93 | no change |
| 1 | Compound 82 | 8.8 | 93 | 80 | no change |
| 1 | Compound 83 | 9.5 | 98 | 90 | no change |

TABLE 2

Light stablilizing action in the case of the combination of polyalkyl-piperidine compounds and UV-absorbers

| I % | II Light stabilizer | III Δ BYV after weathering (QUV) for 1,200 hours | IV 20° gloss after weathering (QUV) 0 hours | IV 20° gloss after weathering (QUV) 1,200 hours | V Appearance after weathering (QUV) for 1,200 hours |
|---|---|---|---|---|---|
| — | — | 16 | 97 | 16 | crazing, blistering and delamination |
| 0.5<br>0.5 | Compound 11<br>2-(2-Hydroxy-3,5-di-tert.-amyl-phenyl)-benztriazole | 6.2 | 99 | 93 | no change |
| 0.5<br>0.5 | Compound 29<br>2-[2-Hydroxy-3,5-di-(α, α-dimethylbenzyl)-phenyl]-benztriazole | 7.2 | 97 | 91 | no change |
| 0.5<br>0.5 | Compound 53<br>2-[2-Hydroxy-3,5-di-(α, α-dimethylbenzyl)-phenyl]-benztriazole | 6.4 | 98 | 91 | no change |
| 0.5<br>0.5 | Compound 80<br>2-[2-Hydroxy-3,5-di-(α,α-dimethylbenzyl)-phenyl]-benztriazole<br>Compound 63 | 7.9 | 92 | 79 | no change |

TABLE 2-continued

Light stabilizing action in the case of the combination of polyalkyl-piperidine compounds and UV-absorbers

| I % | II Light stabilizer | III Δ BYV after weathering (QUV) for 1,200 hours | IV 20° gloss after weathering (QUV) | | V Appearance after weathering (QUV) for 1,200 hours |
|---|---|---|---|---|---|
| | | | 0 hours | 1,200 hours | |
| 0.5 | 2-[2-Hydroxy-3,5-di-(α,α-dimethylbenzyl)-phenyl]-benztriazole | 7.6 | 97 | 88 | no change |
| 0.5 | Compound 30 | | | | |
| 0.5 | 2-[2-Hydroxy-3,5-di-(α,α-benztriazole | 7.6 | 97 | 82 | no change |
| 0.5 | Compound 31 | | | | |
| 0.5 | 2-[2-Hydroxy-3,5-di-(α,α-dimethylbenzyl)-phenyl]-benztriazole | 8.0 | 97 | 86 | no change |

TABLE 3

| I % | II Light stabilizer | III Δ BYV after weathering (QUV) for 1,200 hours | IV 20° gloss after weathering (QUV) | | V Appearance after weathering (QUV) for 1,200 hours |
|---|---|---|---|---|---|
| | | | 0 hours | 1,200 hours | |
| — | — | 16 | 97 | 16 | crazing and blistering and delamination |
| 1 | 2-(2-Hydroxy-3,5-di-tert.-amyl-phenyl)-benztriazole | 12.5 | 97 | 53 | cloudy, extensive blistering |
| 2 | 2-Hydroxy-4-dodecyloxy-benzophenone | 9.5 | 99 | 87 | cloudy, crazing |
| 2 | 2,4-Dihydroxy-benzo-phenone | 9.4 | 99 | 26 | cloudy, crazing |
| 2 | 2,2'-Dihydroxy-4,4'-dimethoxy-benzophenone | 10.6 | 99 | 36 | cloudy, crazing |

What is claimed is:

1. A method for stabilizing two-layer uni-lacquer coatings based on acrylic, alkyd or polyester resins, melamine/formaldehyde resins, epoxide resins or polyisocyanates against the adverse effects of light, humidity and oxygen which comprises incorporating in said resin (1) a 2,2,6,6-tetraalkylpiperidine compound, its acid addition salts or metal complexes, and (2) a second ultraviolet light absorbing compound; said components (1) and (2) being present in a total concentration of from about 0.02 to 5.0%, by weight of the resin components.

2. The method according to claim 1, wherein said component (1) corresponds to a light stabilizer of the formula (II)

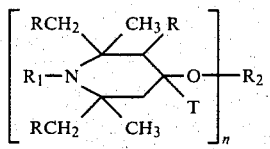

(II)

in which n is the numbers 1–4, T is hydrogen or —CONH$_2$, R is hydrogen or methyl, R$_1$ is hydrogen, oxyl, C$_1$–C$_{18}$ alkyl, C$_3$–C$_8$ alkenyl, C$_3$–C$_8$ alkynyl, C$_7$–C$_{12}$ aralkyl, C$_1$–C$_8$ alkanoyl, C$_3$–C$_5$ alkenoyl, glycidyl or a group —CH$_2$CH(OH)—Z, in which Z is hydrogen, methyl, ethyl or phenyl and R$_2$, if n=1, is hydrogen, C$_1$–C$_{18}$ alkyl, which C$_1$–C$_{18}$ alkyl interrupted by one or more oxygen atoms, cyanoethyl, benzyl, glycidyl, a monovalent radical of an aliphatic, cycloaliphatic, araliphatic, aromatic or heterocyclic carboxylic acid, carbamic acid or phosphoruscontaining acid or a monovalent silyl radical, if n=2 is C$_1$–C$_{12}$ alkylene, C$_4$–C$_{12}$ alkenylene, xylylene, a divalent radical of an aliphatic, cycloaliphatic, araliphatic, aromatic or heterocyclic dicarboxylic acid, dicarbamic acid or phosphorus-containing acid or a divalent silyl radical, if n=3 is a trivalent radical of an aliphatic, cycloaliphatic, aromatic or heterocyclic tricarboxylic acid, of an aromatic tricarbamic acid or of a phosphorus-containing acid or a trivalent silyl radical and if n=4 is a tetravalent radical of an aliphatic, cycloaliphatic or aromatic tetracarboxylic acid.

3. The method, according to claim 2, wherein in said light stabilizer of the formula (II), n is the number 1 or 2, R is hydrogen or methyl, R$_1$ is hydrogen, C$_1$–C$_{12}$ alkyl, allyl, benzyl, acetyl or acryloyl and R$_2$, if n=1, is a radical of an aliphatic carboxylic acid having 2–18 C atoms, of a cycloaliphatic carboxylic acid having 5–12 C atoms or of an aromatic carboxylic acid having 7–15 C atoms, and if n=2 is a radical of an aliphatic dicarboxylic acid having 2–36 C atoms, of a cycloaliphatic or aromatic dicarboxylic acid having 8–14 C atoms or of an aliphatic, cycloaliphatic or aromatic dicarbamic acid having 8–14 C atoms.

4. The method according to claim 1, wherein stabilizer (1) corresponds to the formula (III)

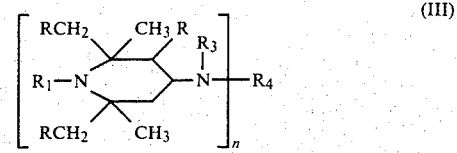

(III)

in which n is the number 1 or 2, R is hydrogen or methyl, $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl, glycidyl or —$CH_2CH(OH)$—Z in which Z is hydrogen, methyl, ethyl or phenyl, and $R_3$ is hydrogen, $C_1$-$C_{12}$ alkyl, $C_5$-$C_7$ cycloalkyl, $C_7$-$C_8$ aralkyl, $C_2$-$C_{18}$ alkanoyl, $C_3$-$C_5$ alkenoyl or benzoyl and $R_4$, if n=1, is hydrogen, $C_1$-$C_{18}$ alkyl, $C_5$-$C_7$ cycloalkyl, $C_2$-$C_8$ alkenyl, which is unsubstituted or substituted by a cyano, alkoxycarbonyl or carbamide group, glycidyl or a group of the formula —$CH_2$—$CH(OH)$—Z" or of the formula —$CONH$—Z", in which Z" is hydrogen, methyl or phenyl, and if n=2 is $C_2$-$C_{12}$ alkylene, $C_6$-$C_{12}$ arylene, xylylene, a —$CH_2$—$CH(OH)$—$CH_2$ group or a group —$CH_2$—$CH(OH)$—$CH_2$—O—X—O—$CH_2(OH)$—$CH_2$—, in which X is $C_2$-$C_{10}$ alkylene, $C_6$-$C_{15}$ arylene or $C_6$-$C_{12}$ cycloalkylene, or, with the proviso that $R_3$ is not alkanoyl, alkenoyl or benzoyl, $R_4$ is also a divalent radical of an aliphatic, cycloaliphatic or aromatic dicarboxylic acid or dicarbamic acid or the group —CO—, or $R_3$ and $R_4$ together, if n=1, is the imide radical of an aliphatic, cycloaliphatic or aromatic 1,2- or 1,3-dicarboxylic acid.

5. The method according to claim 1, wherein stabilizer (1) corresponds to the formula (IV)

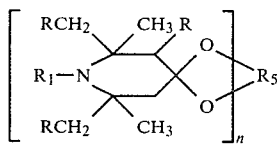

in which n is the number 1 or 2, R is hydrogen or methyl, $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl, glycidyl or —$CH_2CH(OH)$—Z in which Z is hydrogen, methyl, ethyl or phenyl, and $R_5$, if n=1, is $C_2$-$C_8$ alkylene or hydroxy-alkylene or $C_4$-$C_{22}$ acyloxyalkylene, and if n=2 is the group (—$CH_2$)$_2C(CH_2$—)$_2$.

6. The method according to claim 1, wherein stabilizer (1) corresponds to the formulae (VA), (VB) or (VC)

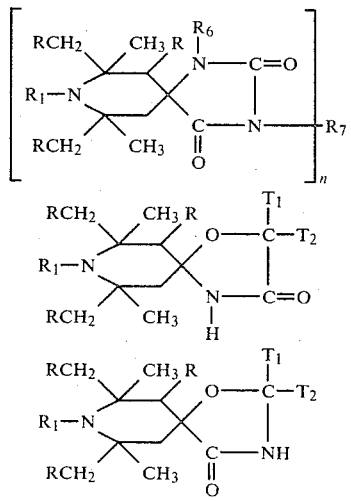

in which n is the number 1 or 2, R is hydrogen or methyl, $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl, glycidyl or —$CH_2CH(OH)$—Z in which Z is hydrogen, methyl, ethyl or phenyl, and $R_6$ is hydrogen, $C_1$-$C_{12}$ alkyl, allyl, benzyl, glycidyl or $C_2$-$C_6$ alkoxyalkyl and $R_7$, if n=1, is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl or a group of the formula —$(CH_2)_m$—COO—Q or of the formula —$(CH_2)_m$—O—CO—Q, in which m is 1 or 2 and Q is $C_1$-$C_{18}$ alkyl or phenyl, and if n=2 is $C_2$-$C_{12}$ alkylene or $C_6$-$C_{12}$ arylene, $C_4$-$C_{12}$ alkenylene a group —$CH_2$—$CH(OH)$—$CH_2$—O—X—O—$CH_2CH(OH)$—$CH_2$—, in which X is $C_2$-$C_{10}$ alkylene, $C_6$-$C_{15}$ arylene or $C_6$-$C_{12}$ cycloalkylene, or a group —$CH_2CH(OZ')CH_2$—$(OCH_2$—$CH(OZ')CH_2)_2$— in which Z' is hydrogen, $C_1$-$C_{18}$ alkyl, allyl, benzyl, $C_2$-$C_{12}$ alkanoyl or benzoyl, and $T_1$ and $T_2$ independently of one another are hydrogen, $C_1$-$C_{18}$ alkyl or $C_6C_{10}$ aryl which is unsubstituted or substituted by halogen or $C_1$-$C_4$ alkyl, or $C_7$-$C_9$ aralkyl, or $T_1$ and $T_2$ together with the C atom which bonds them form $C_5$-$C_7$ cycloalkyl, pyrrolidinyl or piperidinyl, which are unsubstituted or substituted by $C_1$-$C_4$ alkyl.

7. The method according to claim 1, wherein stabilizer (1) corresponds to the formula (VI)

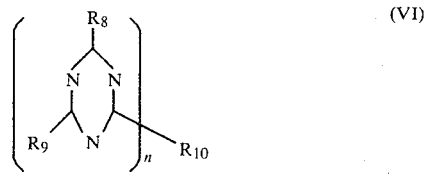

in which n is the number 1 and 2 and $R_8$ is a group of the formula

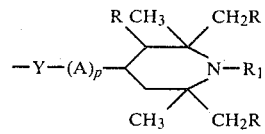

in which R is hydrogen or methyl, $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl, glycidyl or —$CH_2CH(OH)$—Z in which Z is hydrogen, methyl, ethyl or phenyl, Y is —O— or —$NR_{11}$—, A is $C_2$-$C_6$ alkylene or —$(CH_2)_3$—O— and p is the numbers 0 or 1, $R_9$ is the groups $R_8$, $NR_{11}R_{12}$, —$OR_{13}$, —$NHCH_{12}OR_{13}$ or —$N(CH_2OR_{13})_2$, and $R_{10}$, if n=1, is the group —Y—D—Y—, in which D is $C_2$-$C_6$ alkylene which can be interrupted by —$N(R_{11})$—, and $R_{11}$ is $C_1$-$C_{12}$ alkyl, cyclohexyl, benzyl or $C_1$-$C_4$ hydroxyalkyl or a group of the formula

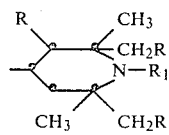

$R_{12}$ is $C_1$-$C_{12}$ alkyl, cyclohexyl, benzyl or $C_1$-$C_4$ hydroxyalkyl, $R_{13}$ is hydrogen, $C_1$-$C_{12}$ alkyl or phenyl and $R_{14}$ is hydrogen, $C_1$-$C_{12}$ alkyl, cyclohexyl, benzyl or phenyl, or $R_{11}$ and $R_{12}$ together are $C_4$-$C_5$ alkylene or oxaalkylene, or $R_{11}$ and $R_{12}$ are each a group of the formula

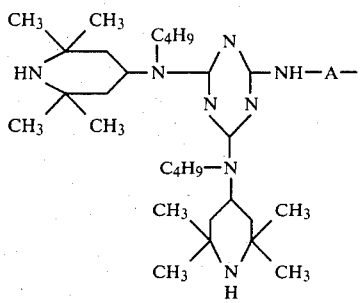

8. The method according to claim 1, wherein stabilizer corresponds to the formula (VII)

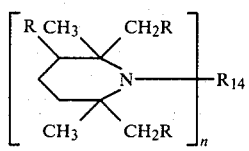

(VII)

in which n is the number 1 or 2, R is hydrogen or methyl and $R_{14}$, if n=1, is $C_4$-$C_{18}$ alkyl, $C_7$-$C_{12}$ aralkyl, the group —CO—$R_{15}$ or $C_1$-$C_4$ alkyl substituted by —CN, —COO$R_{16}$, —OH or —OCO$R_{17}$, in which $R_{15}$ is $C_1$-$C_{12}$ alkyl, $C_2$-$C_4$ alkenyl or phenyl, $R_{16}$ is $C_1$-$C_{18}$ alkyl and $R_{17}$ is $C_1$-$C_{18}$ alkyl, $C_2$-$C_{10}$ alkenyl, cyclohexyl, benzyl or $C_6$-$C_{10}$ aryl, or, if n=2, $R_{14}$ is $C_4$-$C_{12}$ alkylene, 2-but-1,4-enylene, xylylene, the group —$(CH_2)_2$—OOC—$R_{18}$—COO—$(CH_2)_2$— or the group —$CH_2$—OOC—$R_{19}$—COO—$CH_2$—, in which $R_{18}$ is $C_2$-$C_{10}$ alkylene, phenylene or cyclohexylene and $R_{19}$ is $C_2$-$C_{10}$ alkylene, xylylene or cyclohexylene.

9. The method according to claim 1, wherein stabilizer (1) corresponds to the formula VIII

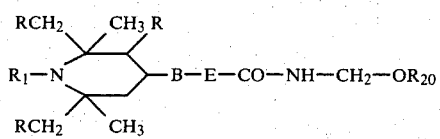

(VIII)

in which B is —N($R_{21}$)— or —O—, E is $C_1$-$C_3$ alkylene, the group, —$CH_2$—CH($R_{22}$)—O—, in which $R_{22}$ is hydrogen, methyl or phenyl, the group —$(CH_2)_3$—NH— or a single bond, R is hydrogen or methyl, $R_1$ is hydrogen, oxyl, $C_1$-$C_{18}$ alkyl, $C_3$-$C_8$ alkynyl, $C_7$-$C_{12}$ aralkyl, $C_1$-$C_8$ alkanoyl, $C_3$-$C_5$ alkenoyl, glycidyl or a group —$CH_2$—CH(OH)—Z, in which Z is hydrogen, methyl or phenyl, and $R_{20}$ is hydrogen or $C_1$-$C_{18}$ alkyl and $R_{21}$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group —$CH_2$—CH($R_{22}$)—OH, in which $R_{22}$ is as defined above, a group of the formula

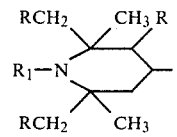

or a group of the formula

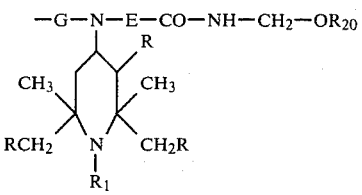

in which G is $C_2$-$C_6$ alkylene or $C_6$-$C_{12}$ arylene, or $R_{21}$ is a group —E—CO—NH—$CH_2$—O$R_{20}$.

10. The method according to claim 1, wherein the light stabilizer (1) is a polymeric compound in which the recurring structural unit contains a 2,2,6,6-tetraalkyl-piperidine radical selected from the group consisting of polyester, polyether, polyamide, polyamine, polyurethane, polyurea, polyamino-triazine, poly(meth)acrylate or poly(meth)acrylamide, and a copolymer thereof, which contains such a radical.

11. The method according to claim 1, wherein the light stabilizer (1) is a compound which contains, in its molecule at least one 2-(2'-hydroxyphenyl)-benztriazole group or 2-hydroxybenzophenone group and at least one polyalkylpiperidine group.

12. The method according to, claim 1 wherein the 2,2,6,6-tetraalkylpiperidine compound is used in a minimum amount of 0.01% by weight, based on the solvent-free binder.

13. The method according to claim 1, wherein antioxidants, plasticizers, flow control agents, curing accelerators, thickeners, dispersing agents or adhesion improvers are added as further additives.

14. The method according to claim 1, wherein the light stabilizer is incorporated in the topcoat lacquer.

15. The method according to claim 1, wherein the topcoat lacquer used is a lacquer based on acrylic/melamine resins.

16. The method of claim 1, wherein said light absorbing compound (2) is selected from the group consisting of benzophenones, oxalanilides, benzotriazoles, acrylic acid derivatives and organic nickel compounds.

17. The method of claim 16, wherein said compound (2) is a benzotrizole.

* * * * *